Patented Dec. 8, 1931

1,835,888

UNITED STATES PATENT OFFICE

JAMES N. McCOY, OF VINCENNES, INDIANA, ASSIGNOR OF ONE-HALF TO HARRY R. CHAMP, OF INDIANAPOLIS, INDIANA

METHOD OF STIMULATING VEGETATION

No Drawing. Application filed March 4, 1931. Serial No. 520,156.

This invention relates generally to a process for treating seeds, roots, bulbs, tubers, and the like with predetermined exposure to the influence of X-rays, for stimulating growth and development of the same before planting, whereby to increase the yields after planting, and to fortify the resultant vegetation against destructive effects of drought and extremes of heat and cold, and other deleterious causes.

It is an object of this invention to provide a systematized method of treatment of certain seeds, bulbs, roots, tubers, and the like, whereby the stimulation resulting therefrom continues throughout the life of the plant or vegetation, from the period of germination, to the period of maturity.

It is also an object of this invention to provide a method or process of treatment of the type described for hastening growth and development of the plants or vegetation, and to increase the resistance to disease and adverse climatic conditions.

It is also an object of this invention to provide a method or process of treatment of the kind described, to take the place and to have a similar effect to the addition of proper fertilizers in the plant or soil as done at the present time.

These and other objects of the invention, its nature, its composition and arrangement of steps and operations, and the sequence of duration of its steps and operations and the manner of conducting the same, will be readily understood by any one acquainted with the art to which this invention relates upon consulting the following description.

The method of invented by me differs from the ordinary stimulant X-ray treatment which is presently employed for the treatment of human beings and animals, since it was discovered by me that the focal distance, voltage, milliamperes, time of exposure and the character of the filters used in such treatment have a destructive effect on plants and vegetation and seeds, and roots, and the like. It was found by experiment that a certain coordination of the factors mentioned above produce little or no effect, and other proportions will have a destructive effect, and that some other proportionate arrangements of the factors have a beneficial and stimulative effect, and I believe that I have determined the maximum beneficial proportionment of said factors, whereby to produce the maximum beneficial effect and to increase to the maximum the power of germination and growth of plants and their seeds and the like upon exposure to the resultant of said factors. It was likewise discovered that the variation in proportionment of the factors in the case of different plants is very small, but nevertheless completely existent and of considerable importance in properly treating the plants and seeds and the like. It was observed in experimenting with my improved process, that seeds germinate quicker, and that the plants from the treated seeds show a marked superiority in the early stages of growth, and at maturity have an increased yield, the foliage being more luxuriant, the stems sturdier, the root systems and flowers and fruits healthier and more beautiful in color than similar seeds and the like not having the benefit of said treatment. The method or process is inexpensive, easy and quickly administered.

The method or process consists in applying certain valuations in terms of MM's of substance equivalent to aluminum in the form of a filter, focal distance in inches, from the anode of the X-ray machine to the object, the current load designated in milliamperes, the time of exposure of the object to the X-rays in terms of seconds, and the value of the current supplied to the machine designated in peak kilo volts. The machine used may be of the type of the standard broad focus Coolidge X-ray type, with distance, current, at the designated peak kilo volts at the time of exposure through designated filters as indicated in the following table which applies to different types and kinds of plants and seeds, tubers and bulbs.

| Object | Filter | Focal dist. | Mill. amp's. | Time | Value in P.K.V. |
|---|---|---|---|---|---|
| | Mm. aluminum | Inches | | Sec. | |
| Corn | 1 | 30 | 7 | 60 | 105 |
| Spring wheat | 1 | 30 | 3½ | 60 | 105 |
| Winter wheat | 2½ | 30 | 3 | 60 | 105 |
| Soy beans | 4 | 36 | 3 | 50 | 110 |
| Potatoes | 1 | 36 | 7 | 50 | 110 |
| Sweet potatoes | 1 | 40 | 3½ | 55 | 105 |
| Cantaloupe | ½ | 30 | 3½ | 15 | 110 |
| Garden pea | 4 | 36 | 3 | 15 | 110 |
| Lima beans | 5 | 36 | 3½ | 15 | 110 |
| Radish | 1 | 40 | 3½ | 30 | 105 |
| Beet, garden | 1 | 25 | 3½ | 30 | 105 |
| Turnip | 1 | 32 | 3½ | 30 | 105 |
| Dahlia | 1 | 30 | 3½ | 55 | 110 |
| Canna | 2 | 30 | 3½ | 60 | 110 |
| Gladiolus | 2 | 30 | 3½ | 50 | 110 |
| Carrot | 1 | 40 | 3½ | 30 | 105 |
| Beans, garden, bunch or pole | 4 | 40 | 3 | 40 | 110 |
| Marigold | 1 | 31 | 1.5 | 60 | 100 |
| Tulip | 1 | 31 | 5 | 60 | 100 |
| Delphinum | 4 | 32 | 1.5 | 50 | 100 |

The method constituting my invention resides in the employment of a standard X-ray machine of the type alluded to under the conditions set out in the above table, whereby to produce the superior novel effect described herein.

It is to be definitely understood that I do not desire to limit the application of this invention to the particular modification set out herein to illustrate the principle thereof and any change or changes may be made in structure and arrangement of parts, and in the sequence and duration of the steps and operation, within the spirit and scope of the invention.

What is claimed is:—

1. The process of exposing seeds, tubers, bulbs, roots and the like before planting, to a predetermined filtered X-ray emanation to stimulate germination and vegetation thereof when planted.

2. The process of exposing seeds, bulbs, roots, tubers and the like before planting, to predetermined filtered X-ray emanations to stimulate and quicken germination thereof and increase the power of vegetation and fruition thereof.

3. The process of exposing seeds, bulbs, roots, tubers and the like before planting, to predetermined filtered X-ray emanations to stimulate and quicken germination thereof before and after planting.

4. The process of exposing seeds, bulbs, roots, tubers and the like before planting, to predetermined filtered X-ray emanations in the form of a dosage to stimulate and quicken germination thereof, and increase growth and development during the life thereof.

5. The process of exposing seeds, bulbs, roots, tubers and the like before planting, to predetermined aluminum filtered X-ray emanations to stimulate and quicken germination thereof, and increase growth and development during the life thereof, and increase the resistance thereof to disease and extremes of climatic conditions.

6. The process of subjecting seeds, bulbs, roots, tubers and the like to aluminum filtered X-ray emanations resulting from a predetermined coordination of focal distance, character of filter, time of exposure, milliamperes, and peak kilo-volts current.

In testimony whereof I affix my signature.

JAMES N. McCOY.